US012689238B2

(12) United States Patent
Zha et al.

(10) Patent No.: US 12,689,238 B2
(45) Date of Patent: Jul. 21, 2026

(54) MICROWAVE POWER DISTRIBUTION NETWORK AND METHOD BASED ON PHASE-FREQUENCY HYBRID CONTROL

(71) Applicant: TSINGHUA UNIVERSITY, Beijing (CN)

(72) Inventors: Hao Zha, Beijing (CN); Focheng Liu, Beijing (CN); Jiaru Shi, Beijing (CN); Qiang Gao, Beijing (CN); Huaibi Chen, Beijing (CN); Wenhui Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 126 days.

(21) Appl. No.: 18/894,000

(22) Filed: Sep. 24, 2024

(65) Prior Publication Data

US 2025/0015638 A1    Jan. 9, 2025

Related U.S. Application Data

(63) Continuation of application No. PCT/CN2022/082808, filed on Mar. 24, 2022.

(51) Int. Cl.
*H02J 50/20*        (2016.01)
*H05H 7/02*        (2006.01)

(52) U.S. Cl.
CPC ............... *H02J 50/20* (2016.02); *H05H 7/02* (2013.01); *H05H 2007/027* (2013.01)

(58) Field of Classification Search
None
See application file for complete search history.

(56) References Cited

U.S. PATENT DOCUMENTS 5,063,365 A      11/1991  Cappucci
5,883,552 A  *   3/1999  McKay ..................... H01P 5/12
                                                                        333/127
(Continued)

FOREIGN PATENT DOCUMENTS

CN        203482482 U      3/2014
CN        103825076 A      5/2014
(Continued)

OTHER PUBLICATIONS

Extended European Search Report dated Apr. 1, 2025 received in corresponding European Application No. EP22932676.4.
(Continued)

*Primary Examiner* — Srinivas Sathiraju

(57)                ABSTRACT

The present disclosure discloses a microwave power distribution network (10) and method based on phase-frequency hybrid control, an electronic device, and a storage medium. The microwave power distribution network (10) includes a first-stage microwave combining and distribution subnetwork (100) based on phase control and a second-stage microwave distribution subnetwork (200) based on frequency control. The microwave power distribution network (10) is a passive device and does not require additional signals to change its state or mechanical structure. High-power microwaves generated by power sources with a certain relationship between phases and frequencies are distributed to corresponding output ports after entering the microwave distribution network (10), thereby meeting the needs of fast switching of multi-angle irradiation fields in technologies such as FLASH radiotherapy and stationary CT.

20 Claims, 3 Drawing Sheets

Determine amplitudes and frequencies of $2^N$ microwave input signals according to a position of a second target port and a microwave power level of a target load connected to the second target port, and adjust phases of the $2^N$ microwave input signals according to a predetermined amplitude-phase relationship — S101

Input the adjusted $2^N$ microwave input signals into $2^N$ input ports of the microwave combining and distribution subnetwork based on phase control, and output a microwave signal via a first target port after combining and distributing the adjusted $2^N$ microwave input signals by using a microwave combining and distribution subnetwork based on phase control — S102

Input a microwave signal outputted from the first target port into a single-input multi-output microwave distribution subnetworks based on frequency control, and output the microwave signal via the second target port — S103

(56)                    References Cited

U.S. PATENT DOCUMENTS

| | | | |
|---|---|---|---|
| 6,472,950 B1 * | 10/2002 | London | H01P 5/12 |
| | | | 333/127 |
| 6,522,218 B1 * | 2/2003 | McKay | H01P 5/12 |
| | | | 333/125 |
| 10,062,945 B2 * | 8/2018 | Brueggemann | H01P 5/12 |
| 10,554,051 B2 * | 2/2020 | Lee | H02J 7/42 |
| 10,673,286 B2 * | 6/2020 | Park | H04B 5/79 |
| 10,931,144 B2 * | 2/2021 | Lee | H02J 7/42 |
| 11,139,903 B2 * | 10/2021 | Abdo | H04J 1/08 |
| 11,171,512 B2 * | 11/2021 | Kim | H02J 7/42 |
| 12,184,085 B2 * | 12/2024 | Dyab | B60L 53/122 |
| 12,191,551 B2 * | 1/2025 | Zha | H05B 6/707 |
| 12,494,784 B2 * | 12/2025 | Zhuang | H03K 17/92 |
| 2008/0307636 A1 * | 12/2008 | Hashimoto | G11B 5/4813 |
| 2010/0039051 A1 | 2/2010 | Clayton et al. | |
| 2016/0193481 A1 | 7/2016 | Tantawi et al. | |
| 2019/0081518 A1 * | 3/2019 | Park | H04B 5/79 |
| 2020/0153524 A1 * | 5/2020 | Abdo | H04J 1/08 |
| 2022/0086966 A1 * | 3/2022 | Zha | H05B 6/707 |
| 2022/0123599 A1 * | 4/2022 | Sone | H02J 7/731 |
| 2024/0215146 A1 * | 6/2024 | Zhang | H05H 7/22 |
| 2024/0322609 A1 * | 9/2024 | Qin | H02J 50/402 |
| 2025/0015638 A1 * | 1/2025 | Zha | H02J 50/20 |

FOREIGN PATENT DOCUMENTS

| | | | |
|---|---|---|---|
| CN | 104852112 A | 8/2015 | |
| CN | 107069172 A | 8/2017 | |
| CN | 112259943 A | 1/2021 | |

OTHER PUBLICATIONS

International Search Report dated Dec. 15, 2022 in International Application No. PCT/CN2022/082808. English translation attached.

* cited by examiner

3dB Hybrid

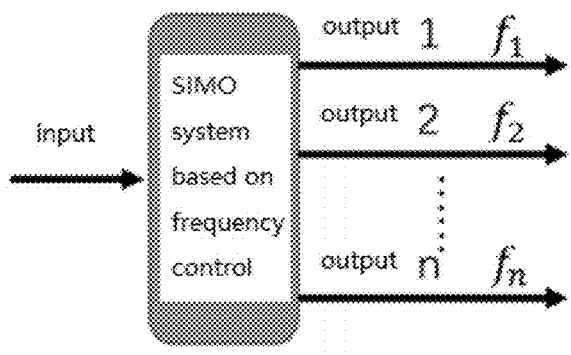

FIG. 4

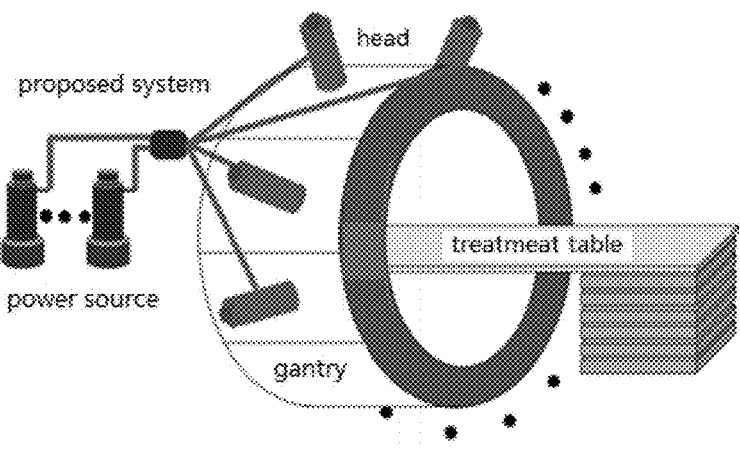

FIG. 5

| Determine amplitudes and frequencies of $2^N$ microwave input signals according to a position of a second target port and a microwave power level of a target load connected to the second target port, and adjust phases of the $2^N$ microwave input signals according to a predetermined amplitude-phase relationship | S101 |

| Input the adjusted $2^N$ microwave input signals into $2^N$ input ports of the microwave combining and distribution subnetwork based on phase control, and output a microwave signal via a first target port after combining and distributing the adjusted $2^N$ microwave input signals by using a microwave combining and distribution subnetwork based on phase control | S102 |

| Input a microwave signal outputted from the first target port into a single-input multi-output microwave distribution subnetworks based on frequency control, and output the microwave signal via the second target port | S103 |

FIG. 6

MICROWAVE POWER DISTRIBUTION NETWORK AND METHOD BASED ON PHASE-FREQUENCY HYBRID CONTROL

CROSS-REFERENCE TO RELATED APPLICATIONS

This application is a continuation of International Application No. PCT/CN2022/082808, titled "MICROWAVE POWER DISTRIBUTION NETWORK AND METHOD BASED ON PHASE-FREQUENCY HYBRID CONTROL", filed on Mar. 24, 2022, the entire contents of which are incorporated herein by reference.

TECHNICAL FIELD

The present disclosure relates to the field of microwave transmission technology, and more particularly, to a microwave power distribution network and method based on phase-frequency hybrid control, an electronic device, and a storage medium.

BACKGROUND

High-power microwave systems have been widely used in technologies such as radar communications and particle accelerators. Particle accelerators can not only be used as tools for humans to further explore the microscopic field, such as large colliders, free electron lasers and synchrotron radiation sources, to promote the exploration of the scientific frontier to the unknown, but also be applied in the fields of radiotherapy, CT imaging technology, industrial irradiation, etc., and have made great contributions to the health of the people, the improvement of living standards, and the development of the national economy.

At present, cancer has become one of the main causes of threats to people's health in modern society. In recent decades, radiotherapy technology has gradually matured and is now widely used in treatment of cancer patients. In particular, dose fractionation, precise conformal and other related technologies have greatly reduced the toxic side effects of radiotherapy and expanded the scope of radiotherapy indications. In recent years, studies have shown that compared with the low-dose rate (0.03 Gy/s-0.1 Gy/s) rays used in conventional radiotherapy, ultra-high dose rate ($\geq$40 Gy/s) instantaneous (<1 s) irradiation can greatly reduce the toxic reaction of normal tissues caused by ionizing radiation. This effect is called the FLASH effect, which is expected to further promote the development of radiotherapy technology and become an important part of the human history of the fight against cancer.

Radiotherapy requires the use of multiple angles and multiple irradiation fields to ensure that the dose distribution is consistent with the target area. Currently, radiotherapy equipment is basically implemented based on a mechanical motion accelerator system. Taking the currently more advanced spiral tomographic radiotherapy (TOMO therapy) system as an example, it uses a method similar to CT scanning for radiotherapy. A linear accelerator is installed on a ring frame. During the treatment process, it can move in a circle with the patient's treatment bed as the center to achieve multi-angle irradiation.

The speed of mechanical movement is limited, and the maximum speed is typically controlled at more than 20 seconds per circle. Mechanical motion radiotherapy equipment is feasible in conventional radiotherapy with low dose rate and long irradiation time, but it is unacceptable for FLASH therapy with high dose rate and irradiation time of less than 1 second.

Similar to radiotherapy, the current industrial CT also uses a mechanical motion accelerator. Since the scanning object of industrial CT is larger, the time-consuming disadvantage is more obvious.

In order to speed up the imaging scanning speed and further improve the imaging quality, a stationary CT technology with a multi-angle ray source array has been proposed in recent years. There are no effective technical methods in the related art to meet the needs of fast switching of multi-angle irradiation fields in the FLASH radiotherapy and the stationary CT, which is a problem needs to be solved.

SUMMARY

The present disclosure provides a microwave power distribution network and method based on phase-frequency hybrid control, an electronic device, and a storage medium, capable of solving the problem of low speed and high time consumption in multi-angle irradiation field radiotherapy and imaging in a mechanically rotating manner using a single machine head containing an accelerator tube as used in traditional radiotherapy and industrial CT.

In a first aspect of the present disclosure, a microwave power distribution network based on phase-frequency hybrid control is provided. The network includes a microwave combining and distribution subnetwork based on phase control, including $2^N$ input ports and $2^N$ intermediate output ports, the microwave combining and distribution subnetwork being configured to determine a first target port from the $2^N$ intermediate output ports according to phases of $2^N$ input signals when the phases of the $2^N$ input signals satisfy a predetermined amplitude-phase relationship, and combine and distribute the $2^N$ microwave input signals for outputting from the first target port, where N is a positive integer greater than or equal to 1; and $2^N$ single-input multiple-output microwave distribution subnetworks based on frequency control, each including one intermediate input port and a plurality of microwave output ports, the $2^N$ intermediate input ports being connected to the $2^N$ intermediate output ports respectively, and the $2^N$ single-input multiple-output microwave distribution subnetworks based on frequency control being configured to select, according to a frequency of a microwave signal outputted from the first target port, a second target port from the plurality of microwave output ports to output a microwave signal.

Optionally, in an embodiment of the present disclosure, the predetermined amplitude-phase relationship may include the $2^N$ input signals having same amplitudes and a phase difference of +90°.

Optionally, in an embodiment of the present disclosure, the microwave combining and distribution subnetwork based on phase control may be composed of at least one 3 dB hybrid or magic T microwave device.

Optionally, in an embodiment of the present disclosure, the $2^N$ microwave input signals may have same frequencies that are equal to the frequency of the microwave signal outputted from the first target port.

Optionally, in an embodiment of the present disclosure, each microwave output port of the single-input multi-output microwave distribution subnetwork based on frequency control may allow a different microwave frequency range to pass, and the microwave frequency ranges of all the microwave output ports may include frequencies of the $2^N$ microwave input signals.

In a second aspect of the present disclosure, a microwave power distribution method based on phase-frequency hybrid control is provided. The method includes: determining amplitudes and frequencies of the $2^N$ microwave input signals according to a position of the second target port and a microwave power level of a target load connected to the second target port, and adjusting phases of the $2^N$ microwave input signals according to the predetermined amplitude-phase relationship; inputting the adjusted $2^N$ microwave input signals into the $2^N$ input ports of the microwave combining and distribution subnetwork based on phase control, and outputting a microwave signal via the first target port after combining and distributing the adjusted $2^N$ microwave input signals by using the microwave combining and distribution subnetwork based on phase control; and inputting the microwave signal outputted from the first target port into the single-input multi-output microwave distribution subnetworks based on frequency control, and outputting the microwave signal via the second target port.

Optionally, in an embodiment of the present disclosure, the predetermined amplitude-phase relationship may include the $2^N$ input signals having same amplitudes and a phase difference of ±90°.

In a third aspect of the present disclosure, an electronic device is provided. The electronic device includes a memory, a processor, and a computer program stored in the memory and executable on the processor. The processor is configured to execute the program to implement the microwave power distribution method based on phase-frequency hybrid control according to the above embodiment.

In a fourth aspect of the present disclosure, a computer-readable storage medium is provided. The computer-readable storage medium has a computer program stored thereon. The program, when executed by a processor, implements the microwave power distribution method based on phase-frequency hybrid control according to the above embodiment.

Therefore, the present disclosure has at least the following advantageous effects.

The embodiments of the present disclosure mainly consist of a first-stage microwave combining and distribution network based on phase control and a second-stage microwave distribution network based on frequency control. The network is a passive device and does not require additional signals to change its state or mechanical structure. High-power microwaves generated by power sources with a certain relationship between phases and frequencies are distributed to corresponding output ports after entering the microwave distribution network, thereby saving frequency band resources and greatly reducing the frequency band requirements for the power source. Meanwhile, the device design and control are simpler, and the requirements for the power source performance and the probability of failure of the entire system due to break-down of a single power source are greatly reduced, thereby improving the system reliability and reducing the cost of the entire system. In addition, the microwave power distribution network based on phase-frequency hybrid control can be applied to the stationary multi-angle irradiation field fast switching irradiation system, thereby meeting the requirements of fast switching of multi-angle irradiation fields in technologies such as FLASH radiotherapy and stationary CT.

Additional aspects and advantages of the present disclosure will be at least partially given in the following description, and at least partially will become apparent from the following description, or will be understood through practice of the present disclosure.

BRIEF DESCRIPTION OF DRAWINGS

The above and/or additional aspects and advantages of the present disclosure will become apparent and easy to understand from the description of the embodiments in combination with the following figures, in which:

FIG. 4 is a schematic diagram showing a SIMO microwave distribution network based on frequency control according to an embodiment of the present disclosure;

FIG. 5 is a schematic diagram showing a multi-angle irradiation field irradiation system based on phase-frequency hybrid control according to an embodiment of the present disclosure;

FIG. 6 is a flowchart illustrating a microwave power distribution method based on phase-frequency hybrid control according to an embodiment of the present disclosure.

Figure 1:
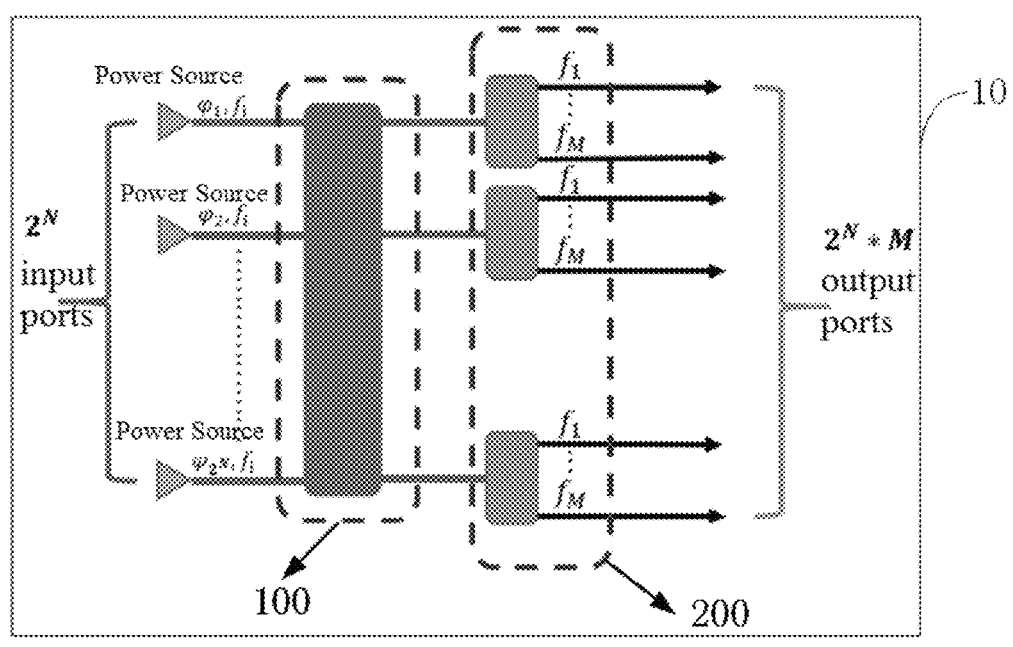
FIG. 1 is a schematic diagram showing an example of a microwave power distribution network based on phase-frequency hybrid control according to an embodiment of the present disclosure.

Reference numerals: microwave combining and distribution subnetwork based on phase control—100, $2^N$ single-input multiple-output microwave distribution subnetworks based on frequency control—200; memory—701, processor—702, communication interface—703.

DESCRIPTION OF EMBODIMENTS

The embodiments of the present disclosure will be described in detail below, and examples of the embodiments are shown in the accompanying figures, throughout which the same or similar reference numerals represent the same or similar elements or elements with the same or similar functions. The embodiments described below with reference to the accompanying figures are exemplary and are intended to be used to explain, rather than limit, the present disclosure.

The microwave power distribution network and method based on phase-frequency hybrid control, electronic device, and storage medium according to the embodiments of the present disclosure will be described below with reference to the accompanying figures. In view of the problem mentioned above in the background, the present disclosure provides a microwave power distribution network based on phase-frequency hybrid control. The embodiments of the present disclosure mainly consist of a first-stage microwave combining and distribution network based on phase control and a second-stage microwave distribution network based on frequency control. The network is a passive device and does not require additional signals to change its state or mechanical structure. High-power microwaves generated by power sources with a certain relationship between phases and frequencies are distributed to corresponding output ports after entering the microwave distribution network, thereby saving frequency band resources and greatly reducing the frequency band requirements for the power source. Meanwhile, the device design and control are simpler, and the requirements for the power source performance and the probability of failure of the entire system due to break-down of a single power source are greatly reduced, thereby improving the system reliability and reducing the cost of the entire system. In this way, the problem of low speed and high time consumption in multi-angle irradiation field radiotherapy and imaging in a mechanically rotating manner using a single machine head containing an accelerator tube as used in traditional radiotherapy and industrial CT can be solved.

FIG. 1 is a schematic diagram showing a structure of a microwave power distribution network based on phase-frequency hybrid control according to an embodiment of the present disclosure.

As shown in FIG. 1, a microwave power distribution network 10 based on phase-frequency hybrid control includes a microwave combining and distribution subnetwork 100 based on phase control and $2^N$ single-input multi-output microwave distribution subnetworks 200 based on frequency control.

Here, the microwave combining and distribution subnetwork 100 based on phase control includes $2^N$ input ports and $2^N$ intermediate output ports, the microwave combining and distribution subnetwork is configured to determine a first target port from the $2^N$ intermediate output ports according to phases of $2^N$ input signals when the phases of the $2^N$ input signals satisfy a predetermined amplitude-phase relationship, and combine and distribute the $2^N$ microwave input signals for outputting from the first target port, where N is a positive integer greater than or equal to 1. $2^N$ single-input multiple-output microwave distribution subnetworks based on frequency control each includes an intermediate input port and a plurality of microwave output ports, the $2^N$ intermediate input ports is connected to the $2^N$ intermediate output ports respectively, and the single-input multiple-output microwave distribution subnetworks based on frequency control is configured to select, according to a frequency of a microwave signal outputted from the first target port, a second target port from the plurality of microwave output ports to output a microwave signal.

It can be appreciated by those skilled in the art that a microwave signal has basic characteristics such as amplitude, phase, and frequency. The amplitude is related to power level and can be adjusted according to use requirements. A power source such as a klystron is an amplifier device, and the phase and frequency of the output microwave can be quickly adjusted by controlling the phase and frequency of the input signal. In the actual implementation process, a high-power microwave generated by the power source with a certain relationship between phase and frequency is distributed to the corresponding output port after entering the above microwave distribution network based on phase-frequency hybrid control. The specific microwave power distribution process will be described in detail below.

Optionally, in an embodiment of the present disclosure, the microwave combining and distribution subnetwork 100 based on phase control can be implemented by microwave devices such as a 3 dB hybrid or a four-branch waveguide connector (magic T). Specifically, the microwave combining and distribution subnetwork based on phase control can include at least one 3 dB hybrid having an input that is the input port of the microwave combining and distribution subnetwork based on phase control and an output that is the intermediate output port of the microwave combining and distribution subnetwork based on phase control. The predetermined amplitude-phase relationship includes the $2^N$ input signals having same amplitudes and a phase difference of $\pm 90°$.

It should be noted that the 3 dB hybrid is the simplest microwave combining and distribution network based on phase control. It has four ports, including two input ports and two output ports, and its function is equivalent to an amplitude quadrature adder of the input microwave. The embodiment of the present disclosure implements the microwave combining and distribution network based on phase control by connecting 3 dB hybrids in series and parallel.

Figure 2:
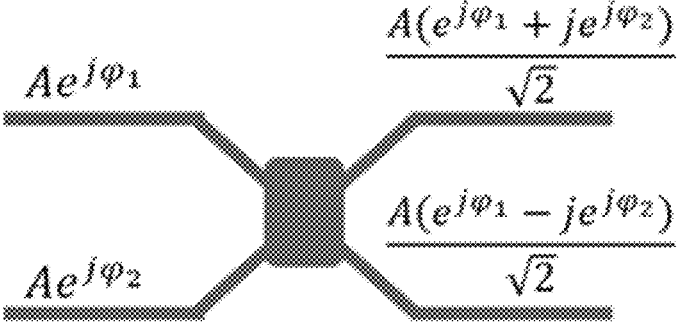
FIG. 2 is a schematic diagram showing a function of a 3 dB hybrid according to an embodiment of the present disclosure.
Figure 3:
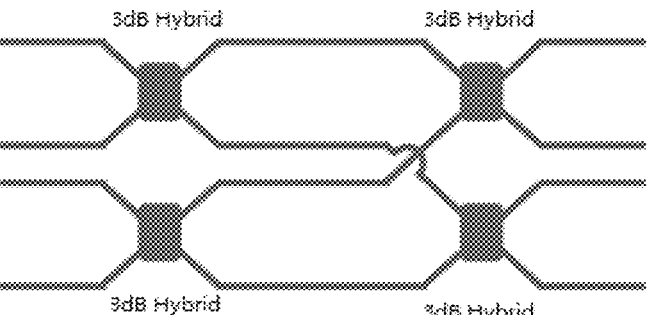
FIG. 3 is a schematic diagram showing a principle of a 4-4 stage microwave combining and distribution network based on phase control implemented based on series-parallel connection of 3 dB hybrids according to an embodiment of the present disclosure.

As shown in FIG. 2, when microwaves having same input amplitudes (both A) and a phase difference between $\varphi_1$ and $\varphi_2$ of $\pm 90°$ are inputted to the two input ports, the microwaves are combined and outputted from one output port. Based on this function, the phase difference between the two input microwaves can be controlled to select the output port of the combined power. Based on the above principle, a $2^N$-$2^N$ microwave combining and distribution network based on phase control (i.e., $2^N$ input ports and $2^N$ output ports) can be implemented. As shown in FIG. 3, it describes the basic principle of implementing a 4-4 stage microwave combining and distribution network based on phase control by connecting 3 dB hybrids in series and parallel. This 4-4 stage network is only used as an example. Other microwave devices that can be described by the same scattering matrix under a certain reference plane and phase-based microwave combining and distribution devices are included here.

It should be noted that the above $2^N$ input ports have the same input amplitudes A, the same frequencies $f_i$ that are equal to the frequency of the microwave signal outputted from the first target port. The microwaves have different phases $\varphi_i$. If the phase difference meets certain requirements, power combining can be performed in the microwave combining and distribution subnetwork based on phase control, and the frequency $f_i$ remains unchanged. With phase control, they can be distributed to different output ports of the microwave combining and distribution subnetwork based on phase control.

The above microwave combining and distribution subnetwork based on phase control is $2^N$-$2^N$, that is, $2^N$ input ports and $2^N$ output ports. Each output port of the microwave combining and distribution subnetwork based on phase control is connected to the input ports of $2^N$ single-input multi-output microwave distribution subnetworks based on frequency control. Here, each microwave output port of the single-input multi-output microwave distribution subnetwork based on frequency control allows a different microwave frequency range to pass, and microwave input signals of different frequencies correspond to different output ports.

The single-input multiple-output microwave distribution subnetwork is a SIMO microwave distribution network based on frequency control, which includes one input port and any number of output ports. Each output port corresponds to a passband of a resonant frequency ft. When the frequency of the input microwave is in the passband of any output port, the microwave is outputted from the output port, as shown in FIG. 4.

Each single-input multiple-output microwave distribution subnetwork based on frequency control includes one input port and $M_i$ (i=1, 2 . . . $2^N$) output ports. The input port of the single-input multiple-output microwave distribution subnetwork based on frequency control is connected to the output port of microwave combining and distribution subnetwork based on phase control at the previous stage, and the output port of the single-input multiple-output microwave distribution subnetwork based on frequency control is connected to a subsequent load. The number $M_i$ of output ports of each single-input multiple-output microwave distribution subnetwork based on frequency control may vary from one another. A special case is that the single-input multiple-output microwave distribution subnetworks based on frequency control adopt the same design, in which case $M_i=M$ (i=1, 2 . . . $2^N$).

The above microwave power distribution network based on phase-frequency hybrid control composed of two subnetworks has $2^N$ input ports and $2^N*M$ output ports. In the single-input multi-output microwave distribution subnetwork based on frequency control, microwaves are allocated to the corresponding output port of the subnetwork depending on the input microwave frequencies $f_i$, and the whole process is shown in FIG. 1. Therefore, by controlling the phases and frequencies of $2^N$ power sources, the output ports corresponding to the microwaves can be quickly switched, and the amplitude A corresponds to the microwave power level and can be adjusted according to the load device.

It can be understood that the embodiment of the present disclosure is mainly composed of two stages, including a first stage of microwave combining and distribution subnetwork based on phase control and a second stage of single-input multi-output microwave distribution subnetworks based on frequency control. The network is a passive device and does not require additional signals to change its state or mechanical structure.

It should be noted that, on the basis of the microwave power distribution network based on phase-frequency hybrid control, the embodiment of the present disclosure further provides a stationary multi-angle irradiation field fast switching irradiation system composed of an accelerating tube array. The irradiation system includes $2^N$ power sources, the microwave power distribution system described in the embodiment of the present disclosure, and an array of $2^N*M$ accelerating tubes connected to the output port of the system, as shown in FIG. 5. By performing phase-frequency hybrid control on the power sources, the microwave power can be transmitted to the accelerators installed at different angles to achieve irradiation of the irradiation fields at the respective angles. The control of phase and frequency belongs to electrical control, and no mechanical movement is involved in the process, so the speed of the entire switching process can be greatly improved.

According to the microwave power distribution network based on phase-frequency hybrid control in the embodiment of the present disclosure, compared with the microwave combining and distribution network based on phase control only, for the same requirement on the total number of output ports, the number of input ports of the microwave combining and distribution network based on phase control according to the embodiment of the present disclosure is reduced by a factor of M, making the device design simpler. Meanwhile, the number of input ports in the embodiment of the present disclosure is reduced by a factor of M, and the number of power sources required is also reduced by a factor of M, such that the control can be simpler, and the probability of failure of the entire system due to break-down of a single power source can be greatly reduced, thereby improving the system reliability and reducing the cost of the entire system. Compared with the SIMO microwave distribution network based on frequency control only, for the same requirement on the total number of output ports, the number of output ports of the microwave distribution network based on frequency control according to the embodiment of the present disclosure is reduced by a factor of $2^N$, and the device design is much simpler. The SIMO microwave distribution network based on frequency control only requires that the frequency passband of each output port does not overlap each other, while a certain SIMO microwave distribution network based on frequency control at the second stage according to the embodiment of the present disclosure still requires that the frequency passband of each output port does not overlap each other, but since each SIMO microwave distribution network based on frequency control corresponds to a different first target port, the frequency passbands between each SIMO microwave distribution networks can overlap, thereby saving frequency band resources and reducing the frequency band requirement for the power source by a factor of $2^N$. In the embodiment of the present disclosure, a power combining function is introduced in the first stage. In order to achieve the same output power, although the number of power sources is increased by $2^N$ times, the maximum power requirement for the output of a single power source is reduced by a factor of $2^N$, that is, the requirement for the power source performance can be reduced.

Specifically, FIG. 6 is a flowchart illustrating a microwave power distribution method based on phase-frequency hybrid control according to an embodiment of the present disclosure.

As shown in FIG. 6, the microwave power distribution method based on phase-frequency hybrid control includes the following steps.

In Step S101, amplitudes and frequencies of $2^N$ microwave input signals are determined according to a position of a second target port and a microwave power level of a target load connected to the second target port, and phases of the $2^N$ microwave input signals are adjusted according to a predetermined amplitude-phase relationship.

It should be noted that in the embodiment of the present disclosure, each microwave output port of the single-input multi-output microwave distribution subnetwork based on frequency control corresponds to a passband of a resonant frequency $f_i$. When the frequency of the input microwave is in the passband of any output port, the microwave is outputted from the output port. Therefore, based on the position of the second target port, the position of the first target port can be confirmed.

In Step S102, the adjusted $2^N$ microwave input signals are inputted into $2^N$ input ports of the microwave combining and distribution subnetwork based on phase control, and a microwave signal is outputted via the first target port after combining and distributing the adjusted $2^N$ microwave input signals by using the microwave combining and distribution subnetwork based on phase control.

In Step S103, the microwave signal outputted from the first target port is inputted into the single-input multi-output microwave distribution subnetworks based on frequency control, and the microwave signal is outputted via the second target port.

Optionally, in one embodiment of the present disclosure, the predetermined amplitude-phase relationship may include the $2^N$ input signals having same amplitudes and a phase difference of ±90°.

It should be noted that the above description of the embodiment of the microwave power distribution network based on phase-frequency hybrid control is also applicable to the microwave power distribution method based on phase-frequency hybrid control of this embodiment, and details will be omitted here.

According to the microwave power distribution method based on phase-frequency hybrid control in the embodiment of the present disclosure, the embodiment of the present disclosure mainly consists of a first-stage microwave combining and distribution subnetwork based on phase control and a second-stage microwave distribution subnetwork based on frequency control. The network is a passive device and does not require additional signals to change its state or mechanical structure. High-power microwaves generated by power sources with a certain relationship between phases and frequencies are distributed to corresponding output ports after entering the microwave distribution network, thereby saving frequency band resources and greatly reducing the frequency band requirements for the power source. Meanwhile, the device design and control are simpler, and the requirements for the power source performance and the probability of failure of the entire system due to break-down of a single power source are greatly reduced, thereby improving the system reliability and reducing the cost of the entire system.

Figure 7:
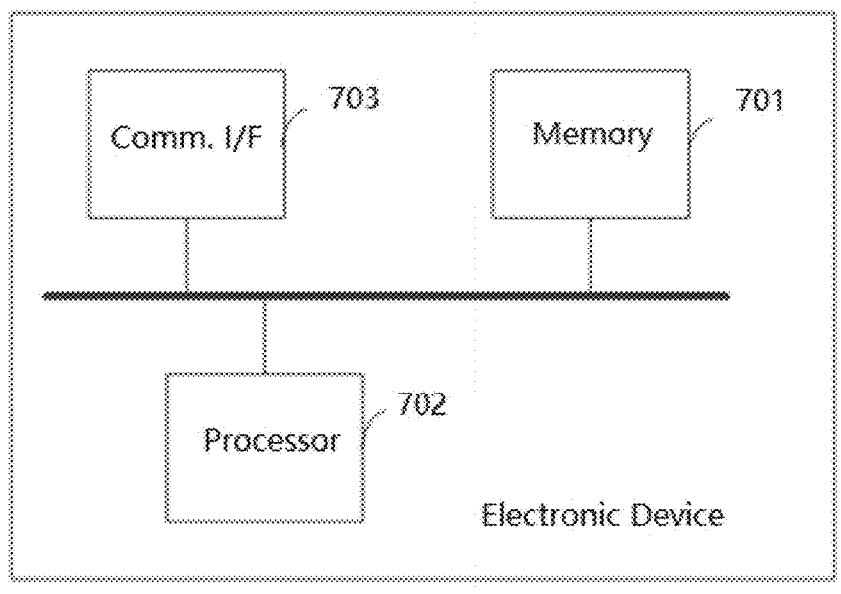
FIG. 7 is a schematic diagram showing a structure of an electronic device according to an embodiment of the present disclosure.

FIG. 7 is a schematic diagram showing a structure of an electronic device according to an embodiment of the present disclosure. The electronic device may include: a memory 701, a processor 702, and a computer program stored in the memory 701 and executable on the processor 702.

The processor 702 is configured to execute the program to implement the microwave power distribution method based on phase-frequency hybrid control according to the above embodiment.

Further, the electronic device may further include:

a communication interface 703 for communication between the memory 701 and the processor 702.

The memory 701 is configured to store a computer program that can be executed on the processor 702.

The memory 701 may include a high-speed RAM memory, and may also include a non-volatile memory, such as at least one disk memory.

If the memory 701, the processor 702, and the communication interface 703 are implemented independently, the communication interface 703, the memory 701 and the processor 702 can be connected to each other through a bus and communicate with each other. The bus can be an Industry Standard Architecture (ISA) bus, a Peripheral Component (PCI) bus, or an Extended Industry Standard Architecture (EISA) bus. The bus can be divided into an address bus, a data bus, a control bus, etc. For the purpose of representation, only one thick line is used in FIG. 7, but it does not mean that there is only one bus or one type of bus.

Optionally, in a specific implementation, if the memory 701, the processor 702, and the communication interface 703 are integrated on a chip, the memory 701, the processor 702, and the communication interface 703 can communicate with each other through an internal interface.

The processor 702 may be a Central Processing Unit (CPU), or an Application Specific Integrated Circuit (ASIC), or one or more integrated circuits configured to implement the embodiments of the present disclosure.

This embodiment also provides a computer-readable storage medium having a computer program stored thereon. The program, when executed by the processor, implements the microwave power distribution method based on phase-frequency hybrid control as described above.

In the description of this specification, the description of the reference terms "one embodiment", "some embodiments", "example", "specific example", or "some examples" means that the specific features, structures, materials, or characteristics described in conjunction with the embodiment or example are included in at least one embodiment or example of the present disclosure.

In this specification, the schematic representation of the above terms does not necessarily refer to the same embodiment or example. Moreover, the specific features, structures, materials or characteristics described can be combined in any one or N embodiments or examples in a suitable manner. In addition, those skilled in the art can combine and incorporate different embodiments or examples described in this specification and the features of different embodiments or examples, provided that they do not conflict each other.

In addition, the terms "first" and "second" are used for descriptive purposes only and cannot be understood as indicating or implying relative importance or implicitly indicating the number of technical features indicated. Thus, the features defined as "first" and "second" may explicitly or implicitly include at least one of the features. In the description of the present disclosure, "N" means at least two, such as two, three, etc., unless clearly and specifically defined otherwise.

Any process or method description in the flowchart or otherwise described herein may be understood as representing a module, fragment or portion of codes including one or more N executable instructions for implementing the steps of a customized logical function or process, and the scopes of the exemplary embodiments of the present disclosure include additional implementations, in which functions may not be performed in the order shown or discussed, including in a substantially simultaneous manner or in a reverse order according to the functions involved, which should be understood by those skilled in the art of the technical field to which the embodiments of the present disclosure belong.

It should be understood that the parts of the present disclosure may be implemented in hardware, software, firmware, or a combination thereof. In the above embodiments, N steps or methods may be implemented in software or firmware stored in a memory and executed by a suitable instruction execution system. For example, if implemented by hardware, as in another embodiment, it can be implemented by any one of the following technologies known in the art or any combination thereof: a discrete logic circuit with a logic gate circuit for implementing a logic function on a data signal, a dedicated integrated circuit with a suitable combination of logic gate circuits, a Programmable Gate Array (PGA), a Field Programmable Gate Array (FPGA), etc.

Those skilled in the art can understand that all or part of the steps carried by the method of the above embodiment can be implemented by a program instructing relevant hardware, and the program can be stored in a computer-readable storage medium and, when executed, include one or any combination of the steps of the method embodiment.

What is claimed is:

1. A microwave power distribution network based on phase-frequency hybrid control, characterized by comprising:

a microwave combining and distribution subnetwork based on phase control, comprising $2^N$ input ports and $2^N$ intermediate output ports, the microwave combining and distribution subnetwork being configured to determine a first target port from the $2^N$ intermediate output ports according to phases of $2^N$ input signals when the phases of the $2^N$ input signals satisfy a predetermined amplitude-phase relationship, and combine and distribute the $2^N$ microwave input signals for outputting from the first target port, where N is a positive integer greater than or equal to 1; and $2^N$ single-input multiple-output microwave distribution subnetworks based on frequency control, each comprising an intermediate input port and a plurality of microwave output ports, the $2^N$ intermediate input ports being connected to the $2^N$ intermediate output ports respectively, and the $2^N$ single-input multiple-output microwave distribution subnetworks based on frequency control being configured to select, according to a frequency of a microwave signal outputted from the first target port, a second target port from the plurality of microwave output ports to output a microwave signal.

2. The network according to claim 1, wherein the predetermined amplitude-phase relationship comprises the $2^N$ input signals having same amplitudes and a phase difference of ±90°.

3. The network according to claim 1, wherein the microwave combining and distribution subnetwork based on phase control is composed of at least one 3 dB hybrid or magic T microwave device.

4. The network according to claim 1, wherein the $2^N$ microwave input signals have same frequencies that are equal to the frequency of the microwave signal outputted from the first target port.

5. The network according to claim 1, wherein each microwave output port of the single-input multi-output microwave distribution subnetwork based on frequency control allows a different microwave frequency range to pass, and the microwave frequency ranges of all the microwave output ports comprise frequencies of the $2^N$ microwave input signals.

6. A microwave power distribution method based on phase-frequency hybrid control, applied in the microwave power distribution network based on phase-frequency hybrid control according to claim 1, the method comprising:
determining amplitudes and frequencies of the $2^N$ microwave input signals according to a position of the second target port and a microwave power level of a target load connected to the second target port, and adjusting phases of the $2^N$ microwave input signals according to the predetermined amplitude-phase relationship;
inputting the adjusted $2^N$ microwave input signals into the $2^N$ input ports of the microwave combining and distribution subnetwork based on phase control, and outputting a microwave signal via the first target port after combining and distributing the adjusted $2^N$ microwave input signals by using the microwave combining and distribution subnetwork based on phase control; and
inputting the microwave signal outputted from the first target port into the $2^N$ single-input multi-output microwave distribution subnetworks based on frequency control, and outputting the microwave signal via the second target port.

7. The method according to claim 6, wherein the predetermined amplitude-phase relationship comprises the $2^N$ input signals having same amplitudes and a phase difference of ±90°.

8. The method according to claim 6, wherein the microwave combining and distribution subnetwork based on phase control is composed of at least one 3 dB hybrid or magic T microwave device.

9. The method according to claim 6, wherein the $2^N$ microwave input signals have same frequencies that are equal to the frequency of the microwave signal outputted from the first target port.

10. The method according to claim 6, wherein each microwave output port of the single-input multi-output microwave distribution subnetwork based on frequency control allows a different microwave frequency range to pass, and the microwave frequency ranges of all the microwave output ports comprise frequencies of the $2^N$ microwave input signals.

11. An electronic device, comprising: a memory, a processor, and a computer program stored in the memory and executable on the processor, wherein the processor is configured to execute the program to implement a microwave power distribution method based on phase-frequency hybrid control, the method being applied in the microwave power distribution network based on phase-frequency hybrid control according to claim 1 and comprising:
determining amplitudes and frequencies of the $2^N$ microwave input signals according to a position of the second target port and a microwave power level of a target load connected to the second target port, and adjusting phases of the $2^N$ microwave input signals according to the predetermined amplitude-phase relationship;
inputting the adjusted $2^N$ microwave input signals into the $2^N$ input ports of the microwave combining and distribution subnetwork based on phase control, and outputting a microwave signal via the first target port after combining and distributing the adjusted $2^N$ microwave input signals by using the microwave combining and distribution subnetwork based on phase control; and
inputting the microwave signal outputted from the first target port into the $2^N$ single-input multi-output microwave distribution subnetworks based on frequency control, and outputting the microwave signal via the second target port.

12. The electronic device according to claim 11, wherein the predetermined amplitude-phase relationship comprises the $2^N$ input signals having same amplitudes and a phase difference of ±90°.

13. The electronic device according to claim 11, wherein the microwave combining and distribution subnetwork based on phase control is composed of at least one 3 dB hybrid or magic T microwave device.

14. The electronic device according to claim 11, wherein the $2^N$ microwave input signals have same frequencies that are equal to the frequency of the microwave signal outputted from the first target port.

15. The electronic device according to claim 11, wherein each microwave output port of the single-input multi-output microwave distribution subnetwork based on frequency control allows a different microwave frequency range to pass, and the microwave frequency ranges of all the microwave output ports comprise frequencies of the $2^N$ microwave input signals.

16. A computer-readable storage medium having a computer program stored thereon, the program, when executed by a processor, implementing a microwave power distribution method based on phase-frequency hybrid control, the method being applied in the microwave power distribution network based on phase-frequency hybrid control according to claim 1 and comprising:
determining amplitudes and frequencies of the $2^N$ microwave input signals according to a position of the second target port and a microwave power level of a target load connected to the second target port, and adjusting phases of the $2^N$ microwave input signals according to the predetermined amplitude-phase relationship;
inputting the adjusted $2^N$ microwave input signals into the $2^N$ input ports of the microwave combining and distribution subnetwork based on phase control, and outputting a microwave signal via the first target port after combining and distributing the adjusted $2^N$ microwave input signals by using the microwave combining and distribution subnetwork based on phase control; and inputting the microwave signal outputted from the first target port into the $2^N$ single-input multi-output micro-wave distribution subnetworks based on frequency control, and outputting the microwave signal via the second target port.

17. The computer-readable storage medium according to claim 16, wherein the predetermined amplitude-phase relationship comprises the $2^N$ input signals having same amplitudes and a phase difference of ±90°.

18. The computer-readable storage medium according to claim 16, wherein the microwave combining and distribution subnetwork based on phase control is composed of at least one 3 dB hybrid or magic T microwave device.

19. The computer-readable storage medium according to claim 16, wherein the $2^N$ microwave input signals have same frequencies that are equal to the frequency of the microwave signal outputted from the first target port.

20. The computer-readable storage medium according to claim 16, wherein each microwave output port of the single-input multi-output microwave distribution subnetwork based on frequency control allows a different microwave frequency range to pass, and the microwave frequency ranges of all the microwave output ports comprise frequencies of the $2^N$ microwave input signals.

* * * * *